United States Patent [19]

Tomida et al.

[11] Patent Number: 4,838,938

[45] Date of Patent: Jun. 13, 1989

[54] RECORDING LIQUID AND RECORDING METHOD BY USE THEREOF

[75] Inventors: Yasuko Tomida, Atsugi; Shoji Koike, Yokohama, both of Japan

[73] Assignee: Canon Kabushiki Kaisha, Tokyo, Japan

[21] Appl. No.: 154,883

[22] Filed: Feb. 11, 1988

[30] Foreign Application Priority Data

Feb. 16, 1987 [JP] Japan .................................. 62-33711
Feb. 16, 1987 [JP] Japan .................................. 62-33717
Jan. 26, 1988 [JP] Japan .................................. 63-16206

[51] Int. Cl.$^4$ ............................................. C09D 11/02
[52] U.S. Cl. ........................................ 106/22; 106/20; 106/25
[58] Field of Search ............................. 106/20, 22, 25

[56] References Cited

FOREIGN PATENT DOCUMENTS 43843 12/1977 Japan .
104321 9/1978 Japan .
14569 2/1981 Japan .
24472 3/1981 Japan .

Primary Examiner—Prince E. Willis
Assistant Examiner—Helene Kirschner
Attorney, Agent, or Firm—Fitzpatrick, Cella, Harper & Scinto

[57] ABSTRACT

A recording liquid is provided which comprises a dye as a component for forming an image and a liquid medium for dissolving or dispersing said dye, the liquid containing a compound having a three-dimensional moleuclar structure with an empty space therein, and having a molecular weight of 400 or more and a solubility of 3% or more in water. The compound may be a cyclic compound having a plural number of pyranose rings. A recording method employing the above-mentioned recording liquid is also provided.

20 Claims, No Drawings

RECORDING LIQUID AND RECORDING METHOD BY USE THEREOF

BACKGROUND OF THE INVENTION

1. Field of the Invention

This invention relates to a recording liquid for high-quality high-speed recording with rapid fixing and excellent water resistance on paper specifically designed for ink jet recording and other kinds of paper (e.g., for business and domestic use such as copying paper, writing paper, bond paper, continuous business form paper, etc. and various cloths). The recording liquid of the present invention is excellent in storing stability and is also related to a recording method by use thereof.

2. Related Background Art

Ink jet recording systems recording by forming ink droplets by various ink ejection methods and attach some or all of the ink droplets onto a recording medium such as paper, converted paper, plastic film, fabric, etc. Inks used ink jet recording systems include those having various dyes or pigments dissolved or dispersed in a liquid medium comprising water, or water and a water-soluble organic solvent.

Such ink is generally required to performance as mentioned below in relationship with the recording medium.

(1) To record high quality images without feathering.
(2) To rapidly fix printing ink.
(3) To not clog printer nozzles, even when printing is interrupted.
(4) To provide a good frequency response characteristic which is capable of ejecting ink in conformity with the printing speed of the printer.
(5) To stored stably.
(6) To be safe.
(7) To provide durable printed products which are water and light-resistant etc.

In order to satisfy some or all of the above requirements, aggressive investigations have been made from the standpoint of both ink and device, and considerable progress have been achieved in some required performances.

However, in spite of comprehensive studies up to date, among the above requisite performances, particularly deficient performances at present may include:

(1) no feathering on recording medium having fibers, and excellent fixing characteristic;
(2) excellent frequency response characteristic to be adapted to high speed recording;
(3) excellent water resistance of recorded image even when a water-soluble dye is employed;
(4) excellent storing stability, while satisfying the above performances (1)–(3). These goals have not been sufficiently attained up to now.

First of all, concerning feathering or fixing characteristic on the recording medium having fibers exposed thereon, particularly when printing is effected on ordinary paper such as copying paper, writing paper, bond paper, continuous business form paper, etc., there are problems such that feathering occurs along the fibers of paper, and also that fixing characteristic is not sufficient due to the influence of the sizing agent contained therein.

Accordingly, for the purpose of improving anti-feathering and fixing performance, there have been attempted a method in which recording is performed with using an ink whose pH is made strongly alkaline (Japanese Laid-open Patent Publication No. 57862/1981), a method using an ink having a large amount of a surfactant (Japanese Laid-open Patent Publication No. 29546/1980), a method using an ink which is solid at normal temperature and brought into a liquid state by heating (Japanese Laid-open Patent Publication No. 108271/1983), etc. However, the method of performing recording with an ink which is strongly alkaline is dangerous when the ink is touched, and there is also the drawback that both feathering and fixing are not satisfactory in some papers containing a certain kind of sizing agent. In the method using ink with a large amount of a surfactant, feathering may occur quite frequently depending on quality paper, and troubles can occur since the ink may be retracted from the orifice surface to interrupt ejection, or in contrast, the whole orifice surface may be wetted to interrupt ejection, depending on the conditions of the printer head. Further, in the method using an ink which is solid at normal temperature and brought to a liquid state by heating, improvement to some extent with respect to feathering and fixing of print can be seen. However, in such a method, since a feeding device comprising ink dissolution or a heating device within a printer head is required in the design of the printer, there are involved problems that the printer necessarily be greater in size and higher in cost.

Concerning the second problems of the frequency response improvement for high speed recording, most investigations have been made from a mechanical point such as the head construction, etc., and little inquiry has been made up to now on improvement of ejection response frequency with respect to ink.

Generally speaking, frequency response characteristic is improved with decreased ink viscosity, but stability of ejection will also be lowered in accordance therewith. Therefore, it is difficult to develop an ink which has an improved frequency response characteristic while maintaining the ejection stability. Above all, in the on-demand type ink jet system under driving conditions of 1 KHz or higher, there are problems of both inferior frequency response characteristic and inferior ejection stability, and this tendency is more marked when the driving frequency is raised as high as 2 KHz, 4 KHz and is a particularly serious problem in the ink jet system utilizing a piezoelectric element or heat energy.

As for the third problem of water resistance, a large number of methods have been proposed such as using an ink containing an oily dye or pigment, a method of using a special paper having a water-resistance-imparting agent.

However, these methods will cause the near problems of storing stability and increased cost of recording paper.

The fourth problem of storing stability is substantially solved in an aqueous ink comprising conventional water-soluble dye, water-soluble liquid medium, etc., but under the present situation, no inks satisfying all of the performances sufficiently together with the above performaces (1) to (3) are known.

SUMMARY OF THE INVENTION

Accordingly, the principal object of the present invention is to provide a recording liquid which is rapidly fixes both on paper specially designed for ink jet recording and on ordinary papers having fibers exposed on the surface and further subjected to sizing, such as copying paper, writing paper, bond paper, continuous business form paper, etc., and which is capable of printing with little feathering and a recording method by use thereof.

Another object of the present invention is to provide an ink with good frequency response characteristic even if the driving frequency used is high, and an ink jet recording method with a rapid printing speed.

A further object of the present invention to provide an ink excellent in water resistance in spite of using a water-soluble dye, and further a recording method with satisfactory ejection stability and storing stability.

The above objects can be accomplished by the present inventions as specified below.

According to an aspect of the present invention, there is provided a recording liquid, comprising a dye as a component for forming an image and a liquid medium for dissolving or dispersing said dye, said liquid containing a compound having a three-dimensional molecular structure with an empty space therein, and having a molecular weight of 400 or more and a solubility of 3% or more in water.

According to another aspect of the present invention, there is provided a recording liquid, comprising a dye as a component for forming an image and a liquid medium for dissolving or dispersing said dye, said liquid having a viscosity at 25° C. of 5 cp or less, and containing a compound having a three-dimensional molecular structure with an empty space therein, having a molecular weight of 400 or more and a solubility of 3% or more in water.

According to still another aspect of the present invention, there is provided a recording liquid, comprising a dye as a component for forming an image and a liquid medium for dissolving or dispersing said liquid having a solubility of 3% or more in water and containing a cyclic compound having a plural number of pyranose rings.

According to a further aspect of the present invention, there is provided a recording method which performs recording by attaching droplets of a recording liquid onto a recording medium, said recording liquid containing a compound having a three-dimensional molecular structure with an empty space therein, and having a molecular weight of 400 or more and a solubility of 3% or more in water, and said recording medium comprising fibers exposed on the surface thereof.

According to a still further aspect of the present invention, there to provided an ink jet recording method which performs recording by ejecting droplets of a recording liquid at a driving frequency of 1 kHz or higher, said recording liquid containing a compound having a three-dimensional molecular structure with an empty space therein and having a molecular weight of 400 or more and a solubility of 3% or more in water.

DETAILED DESCRIPTION OF THE PREFERRED EMBODIMENTS

The present invention is based on a discovery obtained as the result of intensive study for obtaining a liquid medium ink composition with good water resistance, fixing characteristic and printing quality when used on recording medium having fibers exposed on the recording surface.

The compound having a three-dimensional molecular structure (three-dimensional structure formed by bonding of atoms or molecules), which provides the empty space therein which characterizes the present invention, is a compound having inclusion ability to incorporate another substance in its empty space, more particularly a compound called a host molecule having an empty space for including other substances.

The present invention is characterized by containing a host molecule having inclusion ability, and a guest molecule which is a whole dye molecule or a part thereof as ink constituting components.

The reason why water resistance, fixing characteristic, and printing quality are excellent in recording medium by use of the ink containing a compound in a three-dimensional molecular structure having an empty internal space has not been clarified yet.

It is presumed that an inclusion compound is formed by incorporating a dye molecule or a part thereof into the internal space to increase affinity for recording medium, particularly ordinary paper having been subjected to sizing as compared with the dye alone, whereby fixing characteristic and water resistance is improved. Further, it is considered that formation of an inclusion compound improves wettability toward the head constituting members, thereby improving frequency response characteristic.

Also, since containment of these compounds is not accompanied with considerable lowering in surface tension of ink, no adverse effect is observed on ejection stability. Further, it may be estimated that the dye molecule becomes apparently larger by formation of an inclusion compound to lower its flowability, whereby recording of excellent print quality without feathering can be obtained.

According to the investigations by the present inventors, for obtaining good printing quality without feathering, the size of the host compound contained is important in view of the flowability of the inclusion compound containing the dye, and more specifically, the molecular weight of the host compound shall be 400 or higher, more preferably 800 or higher.

Therefore, with an ink containing a host compound such as urea, thiourea, deoxycholic acid and 18-crown-6 which has been said to have inclusion ability as described in Japanese Patent Publication No. 43843/1978, its feathering prevention effect is insufficient to make it difficult to obtain a record with high print quality.

Further, according to the investigations by the present inventors, in view of long-term storage stability of ink, the solubility of the host molecule in water shall be not less than 3%, and more preferably not less than 5%.

For example, as described in Japanese Laid-open Patent Publication No. 14569/1981, ink containing β-cyclodextrin which has a solubility of less than 3% in water (solubility: 1.58%) has the drawback that it is liable to form a precipitate during storage for a long term.

Examples of the compound having a molecular weight of 400 or more in a three-dimensional structure having internal space formed by bonding of atoms and molecules, and having a water solubility of 3% or more, namely the host compound, to be used in the present invention may include valinomycin type natural antibiotics, various polyether compounds, nigericin type natural antibiotics, or cyclic compounds having a plural pyranose rings, for example, those having formed cyclic compounds through 1,4 and 1,6 bonding of monosaccharides such as glucose, fructose, galactose, etc., and disaccharides such as saccharose, maltose, lactose, etc., but the present invention is not limited to these substances. Among them, a particularly preferable substance is cyclodextrin comprising six or more α-D-glucopyranose groups bonded through α-1,4 bonding to form a cyclic compound, and these compounds exhibit marked effect.

Among cyclodextrins, α-cyclodextrin formed by cyclization of bonding of six glucose molecules, and γ-cyclodextrin formed by bonding of eight glucose molecules, and further derivatives of the above cyclodextrin, for example, maltosylcyclodextrin having maltose bonded for the purpose of improving solubility, etc. are satisfactory.

The content of the above compound may be in the range of from 0.1 to 20% by weight, preferably from 0.2 to 15% by weight, more preferably from 0.5 to 10% by weight, based on the total weight of ink.

If the content of the above compound is less than 0.1% by weight, no marked effect can be obtained on improvement of fixing characteristic, printing quality and ejection stability, while if it exceeds 20% by weight, the ink is not suitable for ink jet recording in such points as increased viscosity of ink or clogging of ink, in nozzles.

As other components constituting the ink of the present invention, first as a dye, there may be included water-soluble dyes such as direct dyes, acidic dyes, basic dyes, food dyes, reactive dyes, vat dyes, soluble vat dyes, etc.

The criteria for "water-solubleness" for the ink of the present invention is water-solubility of 1% or higher at 20° C., which solubility will not cause any problem in performance of ink.

The content of these dyes may be determined depending on the kind of the liquid medium component, the characteristics required for the ink, etc, but generally within the range of from 0.2 to 20% by weight, preferably from 0.5 to 10% by weight, more preferably from 1 to 5% by weight.

As the aqueous liquid medium for dissolving the dye as mentioned above in the present invention, any media used for ink for ink jet recording in general may be available. For example, water and/or organic solvent mentioned below may be preferably used. Examples of the organic solvent may include alkyl alcohols having 1 to 5 carbon atoms such as methyl alcohol, ethyl alcohol, n-propyl alcohol, isopropyl alcohol, n-butyl alcohol, sec-butyl alcohol, tert-buytl alcohol, isobutyl alcohol, n-pentyl alcohol, etc.; amides such as dimethylformamide, dimethylacetamide, etc.; ketones or ketoalcohols such as acetone, diacetone alcohol, etc.; ethers such as tetrahydrofuran, dioxane, etc.; polyalkylene glycols such as polyethylene glycol, polypropylene glycol, etc.; alkylene glycols with alkylene group containing 2 to 6 carbon atoms such as ethylene glycol, propylene glycol, butylene glycol, triethyleneglycol, 1,2,6-hexane triol, thiodiglycol, hexylene glycol, diethylene glycol, etc.; glycerine; lower monoalkyl ethers of polyhydric alcohols such as ethylene glycol monomethyl (or ethyl) ether, diethylene glycol monomethyl (or ethyl) ether, triethylene glycol monomethyl (or ethyl) ether, etc.; lower dialkyl ethers of polyhydric alcohols such as triethylene glycol dimethyl (or ethyl) ether, tetraethylene glycol dimethyl (or ethyl) ether, etc.; sulforane, N-methyl-2-pyrrolidone, 1,3-dimethyl-2-imidazolidinone; and so on.

The essential components of the ink of the present invention are as described above, and other known various additives such as a dispersing agent, a surfactant, a viscosity contoller, a surface tension controller, or an optical brightener may be added as desired.

For example, there may be employed a viscosity controller such as polyvinyl alcohol, celluloses, water-soluble resins, etc.; a surfactant such as cationic, anionic or nonionic surfactants; a surface tension controller such as diethanolamine, triethanolamines, etc.; a pH controller based on a buffer solution; an antifungal agent, etc.

Also for making up an ink to be used for the ink jet recording with electrically charged ink, a specific resistance controller containing an inorganic salt such as lithium chloride, ammonium chloride, sodium chloride, etc. may be added. In the case of applying for the ink jet recording method employing ink ejected by action of heat energy, the thermal property (e.g. specific heat, coefficient of thermal expansion, thermal conductivity, etc.) may be sometimes controlled.

The ink of the present invention as described above is frequently demanded to have the performance for stable ejection from a printer head, particularly the performance for stable ejection at a driving frequency of 1 KHz or higher. Therefore it is desired to be controlled in the properties to be of the low viscosity type, having preferably a viscosity at 25° C. of 5 cp or less, a surface tension of 35 to 65 dyne/cm, more preferably a viscosity of 3 cp or less.

If the visocsty of the ink exceeds 5 cp, even the ink containing the host compound having the inclusion ability according to the present invention may be sometimes insufficient in printing quality, fixing characteristic and frequency response characteristic on ordinary paper.

The ink to be used in the present invention obtained as described above, is above all excellent in water resistance, fixing characteristic and printing quality on ordinary paper generally employed in business and domestic uses and having fibers exposed on the recording surface, and further subjected to sizing, such as copying paper, writing paper, bond paper, continuous business form paper, etc., and effectively used as the ink for ink jet recording of various systems, and can perform excellent recording.

The ink of the present invention is capable of responding precisely to driving frequency for high speed recording for which increasingly higher response ability is required from 1 KHz, to 2 KHz, and 4 KHz, and so on. The ink enables excellent recording for long term, generally with an on-demand type ink jet system, especially the one employing piezoelement or thermal energy.

The present invention is described in more detail by referring to the following Examples, Comparative examples. In the sentences, all parts and % are by weight.

EXAMPLE 1

| | |
|---|---|
| C.I. Food Black 2 | 3 parts |
| Glycerine | 12 parts |
| Ethylene glycol | 8 parts |
| Etylene glycol monophenyl ether | 2 parts |
| Water | 80 parts |
| α-Cyclodextrin | 5 parts |

Of the above components, α-cyclodextrin was firstly dissolved in water, then the dye C.I. Food Black 2 was added and the mixture was stirred for one hour, and further glycerine, ethylene glycol, and ethylene glycol monophenyl ether were added, followed by stirring at 40° C. for 3 hours. Then, after adjustment of the pH of the mixture to 7.5 with 0.1% aqueous solution of sodium hydroxide, the mixture was pressure filtered through Fluoropore Filter (trade name, produced by Sumitomo Denko K.K.) with a pore size of 1μ to obtain an ink (A) of the present invention.

Next, by use of this ink, printing was performed on a commercially available copying paper, bond paper, by means of an ink jet printer utilizing a heat-generating element as the ejection energy source for the ink (orifice size 40×50 μm, heater size 30×150 μm, nozzle number 24, driving voltage 24.5 V, frequency 2 KHz) as the ink jet recording device, and the printed products obtained were evaluated for fixing characteristic, printing quality, storability, and water resistance.

Ink properties and evaluation results are shown in Talbe 1.

EXAMPLE 2

| | |
|---|---|
| C.I. Acid Red 35 | 1.5 parts |
| Glycerine | 9 parts |
| 1,3-Dimethyl-2-imidazolidinone | 10 parts |
| Water | 81 parts |
| α-Cyclodextrin | 1 part |

Of the above components, α-cyclodextrin was firstly dissolved in water, then the dye C.I. Acid Red 35 was added and the mixture was stirred, and further glycerine, 1,3-dimethyl-2-imidazolidinone were added, followed by stirring at 40° C. for 3 hours. Then, after adjustment of the pH of the mixture to 7.5 with 0.1% aqueous solution of sodium hydroxide, the mixture was pressure filtered through Fluoropore Filter (trade name, produced by Sumitomo Denko K.K.) with a pore size of 1μ to obtain an ink (B) of the present invention

EXAMPLE 3

(Preparation of ink (C))

| | |
|---|---|
| C.I. Direct Blue 86 | 3 parts |
| Diethylene glycol | 15 parts |
| Ethylene glycol | 5 parts |
| Diethylene glycol monophenyl ether | 0.7 parts |
| Water | 80 parts |
| γ-Cyclodextrin | 1 part |

Of the above components, γ-cyclodextrin was firstly dissolved in water, then the dye C.I. Direct Blue 86 was added and the mixture was stirred, and further diethylene glycol, ethylene glycol, and ethylene glycol monophenyl ether were added, followed by stirring to 40° C. for 3 hours. Then, after adjustment of the pH of the mixture to 7.5 with 0.1% aqueous solution of sodium hydroxide, the mixture was pressure filtered through Fluoropore Filter (trade name, produced by Sumitomo Denko K.K.) with a pore size of 1μ to obtain an ink (C) of the present invention.

EXAMPLE 4

| | |
|---|---|
| C.I. Direct Black 154 | 3 parts |
| Diethylene glycol | 12 parts |
| N—methyl-2-pyrrolidone | 8 parts |
| Nonionic surfactant (Nissan-nonion P223 (trade name), produced by Nippon Yushi K.K.) | 0.1 part |
| Water | 80 parts |
| Maltosylcyclodextrin (Isoelite P (trade name), produced by Nikken Kagaku K.K.) | 2 parts |

Of the above components, maltosylcyclodextrin was firstly dissolved in water, then the dye C.I. Food Black 154 was added and the mixture was stirred, and further diethylene glycol, N-methyl-2-pyrrolidone, and the nonionic surfactant were added, followed by stirring at 40° C. for 3 hours. Then, after adjustment of the pH of the mixture to 7.5 with 0.1% aqueous solution of sodium hydroxide, the mixture was pressure filtered through Fluoropore Filter (trade name produced by Sumitomo Denko K.K.) with a pore size of 1μ to obtain an ink (D) of the present invention.

EXAMPLE 5

(Preparation of ink E)

| | |
|---|---|
| C.I. Direct Yellow 142 | 2 parts |
| Triethylene glycol | 8 parts |
| Ethylene glycol | 6 parts |
| 1,3-Dimethyl-2-imidazolidinone | 6 parts |
| Water | 80 parts |
| α-Cyclodextrin | 1 part |
| γ-Cyclodextrin | 0.7 parts |

Of the above components, α- and γ-cyclodextrin were dissolved first in water, and then the dye C.I. Direct Yellow 86 was added and the mixture was stirred, and further triethylene glycol, ethylene glycol, and 1,3-dimethyl-2-imidazolidinone were added, followed by stirring at 40° C. for 3 hours. Then, after adjustment of pH to 7.5 with 0.1% aqueous solution of sodium hydroxide, the mixture was pressure filtered through Fluoropore Filter (trade name, produced by Sumitomo Denko K.K.) with a pore size of 1μ to obtain an ink (E) of the present invention.

EXAMPLE 6

| | |
|---|---|
| C.I. Food Black 2 | 2 parts |
| Glycerine | 12 parts |
| Ethylene glycol | 8 parts |
| Ethylene glycol monophenylether | 2 parts |
| Water | 80 parts |
| Monensin (nigericin type natural antibiotic) | 4 parts |

Of the above components, monensin was dissolved first in water, then the dye C.I. Direct Black 2 was added thereto and the mixture was stirred, and further glycerine, ethylene glycol, and ethylene glycol monophenyl ether were added thereto, followed by stirring at 40° C. for 3 hours. Then, after adjustment of pH of the mixture to 7.5 with 0.1% aqueous solution of sodium hydroxide, the mixture was pressure filtered through Fluoropore Filter (trade name, produced by Sumitomo Denko K.K.) with a pore size of 1μ to obtain an ink (F) of the present invention.

COMPARATIVE EXAMPLE 1

Of the components in Example 1, the components excluding α-cyclodextrin were mixed by stirring for 3 hours, and then after adjustment of the pH of the mixture to 7.5 with 0.1% aqueous solution of sodium hydroxide, the mixture was pressure filtered through Fluoropore Filter (trade name, produced by Sumitomo Denko K.K.) with a pore size of 1μ to obtain an ink (G) for comparative purpose.

COMPARATIVE EXAMPLE 2

Of the components in Example 2, the components excluding α-cyclodextrin were treated in the same manner as in Comparative example 1 to obtain an ink (H) for comparative purpose.

COMPARATIVE EXAMPLE 3

Of the components in Example 3, the components excluding γ-cyclodextrin were treated in the same manner as in Comparative Example 1 to obtain an ink (I) for comparative purpose.

COMPARATIVE EXAMPLE 4

Except for using saccharose in place of α-cyclodextrin in Example 1, the treatment was conducted in entirely the same manner as in Example 1 to obtain an ink (J) for comparative purpose.

COMPARATIVE EXAMPLE 5

In Example 4, maltosylcyclodextrin was excluded and 0.5 parts of a nonionic surfactant (Nissan-nonion P223 (trade name), produced by Nippon Yushi K.K.) were added and the treatment was conducted in the same manner as in Comparative example 1 to obtain an ink (K) for comparative purpose.

COMPARATIVE EXAMPLE 6

Of the components in Example 1, β-cyclodextrin was used in place of α-cyclodextrin, following otherwise the same procedure as in Example 1, to obtain an ink (L) for comparative purpose.

COMPARATIVE EXAMPLE 7

Of the components in Example 1, 18-crown-6 was used in place of α-cyclodextrin, following otherwise the same procedure as in Example 1, to obtain an ink (M) for comparative purpose.

COMPARATIVE EXAMPLE 8

Of the components in Example 6, urea was used in place of monensin, following otherwise the same procedure as in Example 6, to obtain an ink (N) for comparative purpose.

The same recording as in Example 1 was also practiced for the inks (B-N) in Examples 2-6 and Comparative examples 1-8. Ink properties and evaluation results are shown in Table 1.

TABLE 1

| | | | Physical properties | | Fixing characteristic | | Printing quality | | | |
|---|---|---|---|---|---|---|---|---|---|---|
| | | Ink | Viscosity (cp) | Surface tension (dyne/cm) | Copying paper | Bond paper | Copying paper | Bond paper | Storability | Water resistance |
| Example | 1 | A | 2.2 | 52 | ++++ | +++ | ++++ | ++++ | +++ | +++ |
| | 2 | B | 2.0 | 59 | ++++ | ++++ | ++++ | ++++ | +++ | +++ |
| | 3 | C | 2.1 | 55 | ++++ | ++++ | +++ | ++++ | +++ | +++ |
| | 4 | D | 2.2 | 43 | ++++ | ++++ | ++++ | ++++ | +++ | +++ |
| | 5 | E | 2.2 | 49 | ++++ | +++ | ++++ | ++++ | +++ | +++ |
| | 6 | F | 2.3 | 51 | ++++ | +++ | ++++ | ++++ | +++ | +++ |
| Comparative Example | 1 | G | 2.1 | 50 | ++++ | ++++ | + | + | +++ | ++ |
| | 2 | H | 2.0 | 60 | + | + | ++++ | ++++ | +++ | ++ |
| | 3 | I | 2.0 | 56 | + | + | ++ | +++ | +++ | ++ |
| | 4 | J | 2.4 | 50 | +++ | ++ | + | + | +++ | + |
| | 5 | K | 2.0 | 38 | ++++ | +++ | + | + | +++ | ++ |
| | 6 | L | 2.2 | 52 | ++++ | +++ | ++++ | ++++ | + | +++ |
| | 7 | M | 2.3 | 52 | ++ | ++ | + | ++ | +++ | +++ |
| | 8 | N | 2.1 | 51 | ++++ | +++ | + | ++ | +++ | + |

1. The viscosity was determined with VISCONIC ELD produced by Tokyo Keiki K.K.

2. The surface tension was determined with KYOWA CBVP SURFACE TENSIOMETER A-1 produced by Kyowa Kagaku K.K.

3. Fixing characteristic was evaluated as below.

10 seconds and 30 seconds after printing on commercially available copying paper and bond paper, the printed portion was rubbed with a filter paper No. 5C (trade name, produced by Toyo Kagaku Sangyo K.K.) (evaluated under the environmental conditions of 25° C., 60% RH)

++++ blurring after 10 seconds
+++ slight blurring after 10 seconds
++ slight blurring after 30 seconds
+ great blurring after 30 seconds 4. Printing quality was determined as below.

After printing on the above-mentioned copying paper and bond paper, the printed matter was left to stand for 1 hour or longer, and feathering, sharpness at the dot level were evaluated. (evaluated under the environmental conditions of 25° C., 60% RH)

++++ no feathering, with edge being extremely sharp
+++ slight feathering observed, with edge of dot being sharp
++ feathering observed in substantially all dots, with edge of dot being slightly vague
+ feathering observed in all dots, with edge of dot being indistinct 5. Storability was determined as below.

Ink was placed in a storing bottle (SCHOTT bottle, produced by DURAN), stored at −30° C. and 60° C. for one month, and presence of precipitate was evaluated.

+++ no precipitate
++ small amount of precipitate
+ large amount of precipitate

6. Water resistance was determined as below.

After printing on the above-mentioned copying paper, the printed sample was left to stand for one day, and then dipped in water for 1 minute and feathering of the image was evaluated.

+++ practically no feathering observed
++ slight feathering observed
+ feathering abundantly generated, making decipherment of the image difficult

EXAMPLES 7-21 AND COMPARATIVE EXAMPLES 9-23

By use of the inks A-E, G-K obtained in Examples 1-5 and Comparative examples 1-5, solid printing with an area of 15×4 cm² and character printing of 130 alphabet letters were effected on a commercially available copying paper by use of the printers A and B shown below by setting the frequency within the range of 1 to 6 KHz, and followability of ink and shot accuracy were examined for evaluation of frequency response of ink. The evaluation results are shown in Table 2.

Here, the followability of ink means the property of ink fed into a nozzle smoothly following ejection of an ink droplet from the nozzle, and the shot accuracy means the accuracy of the points shot by ink droplets on a recording medium.

(Printer A)

An ink jet printer utilizing a heat-generating element as the ejection energy source (heater size 30×150 μm² and having 24 nozzles with an orifice size of 40×50 μm²) (driving voltage 24.5 V).

(Printer B)

Utilizing a piezoelectric element as the means for applying pressure on ink, ink is ejected by mechanical displacement given to the piezoelectric element with electrical signals. An ink jet printer having 8 nozzles with orifice diameter of 50 μm and passage length of 40 mm (driving voltage: 60 V).

TABLE 2

| | Ink | Frequency (KHz) | Printer | Frequency response |
|---|---|---|---|---|
| Example | | | | |
| 7 | A | 2 | A | ++++ |
| 8 | A | 4 | A | ++++ |
| 9 | A | 6 | A | ++++ |
| 10 | B | 1 | A | ++++ |
| 11 | B | 2 | A | ++++ |
| 12 | B | 4 | A | ++++ |
| 13 | C | 1 | B | ++++ |
| 14 | C | 2 | B | ++++ |
| 15 | C | 4 | A | +++ |
| 16 | D | 1 | B | ++++ |
| 17 | D | 2 | B | ++++ |
| 18 | D | 4 | B | +++ |
| 19 | E | 2 | A | ++++ |
| 20 | E | 4 | A | ++++ |
| 21 | E | 6 | A | ++++ |
| Comparative Example | | | | |
| 9 | G | 2 | A | ++ |
| 10 | G | 4 | A | ++ |
| 11 | G | 6 | A | + |
| 12 | H | 1 | A | + |
| 13 | H | 2 | A | + |
| 14 | H | 4 | A | + |
| 15 | I | 1 | B | ++ |
| 16 | I | 2 | B | + |
| 17 | I | 4 | B | + |
| 18 | J | 1 | A | ++ |
| 19 | J | 2 | B | + |
| 20 | J | 4 | B | + |
| 21 | K | 2 | A | ++ |
| 22 | K | 4 | A | ++ |
| 23 | K | 6 | A | + |

7. Evaluation of frequency response was made as below.
The state of print of the printed product obtained, namely blurring or white drop-out state and poor shot state such as splash, localization, etc. obtained was observed and evaluated visually.

++++ followability of ink responding to frequency is good, neither blurring, white drop-out, nor poor shot being observed for both solid printing and character printing +++ followability of ink responding to frequency is substantially good, neither blurring, white drop-out nor poor shot being observed in character printing, but slight blurring being observed in solid printing ++ in character printing, neither blurring nor white drop-out being observed in character printing, but poor shot being partially observed; in solid printing, blurring, white drop-out observed in about ⅓ of the whole solid print area + in solid printing, much blurring and white drop-out being observed, and also in character printing, much blurring and poor shot being observed As described above, according to the present invention, ink jet recording is rendered possible, which can give printing with good water resistance to paper specially prepared for ink jet recording but also to plain papers in general with fibers exposed on the recording surface, and further subjected to sizing, for example, copying paper, writing paper, bond paper, continuous business form paper, with rapid fixing speed and yet with little feathering.

Further, since the ink of the present invention is excellent in storing stability, it has become possible to perform ink jet recording which is safe and excellent in ejection stability and operability of ink over a long term.

Further, since frequency response of ink is good, high speed and stable recording with high driving frequency is rendered possible.

We claim:

1. A recording liquid, comprising a dye as a component for forming an image and a liquid medium for dissolving or dispersing said dye, said liquid containing a compound having a three-dimensional molecular structure with inclusion ability and having a molecular weight of 400 or more and a solubility of 3% or more in water.

2. A recording liquid according to claim 1, wherein said compound has a solubility of 5% or more in water.

3. A recording liquid according to claim 1, wherein said compound has a molecular weight of 800 or more.

4. A recording liquid according to claim 1, wherein the content of said compound is within the range of 0.1 to 20% by weight of the total weight of the recording liquid.

5. A recording liquid according to claim 1, wherein said dye is a water-soluble dye.

6. A recording liquid, comprising a dye as a component for forming an image and a liquid medium for dissolving or dispersing said dye, said liquid having a viscosity at 25° C. of 5 cp or less, and containing a compound having a three-dimensional molecular structure with inclusion ability having a molecular weight of 400 or more and a solubility of 3% or more in water.

7. A recording liquid according to claim 6, wherein said compound has a solubility of 5% or more in water.

8. A recording liquid according to claim 6, wherein said compound has a molecular weight of 800 or more.

9. A recording liquid according to claim 6, wherein the content of said compound is within the range of 0.1 to 20% by weight of the total weight of the recording liquid.

10. A recording liquid according to claim 6, wherein said dye is a water-soluble dye.

11. A recording liquid according to claim 6, wherein said recording liquid has a viscosity at 25° C. of 3 cp or less.

12. A recording liquid according to claim 6, wherein said recording liquid has a surface tension at 25° C. within the range of 35 to 65 dyne/cm.

13. A recording liquid, comprising a dye as a component for forming an image and a liquid medium for dissolving or dispersing said dye, said liquid having a solubility of 3% or more in water and containing a cyclic compound having a plural number of pyranose rings.

14. A recording liquid according to claim 13, wherein said cyclic compound has a solubility of 5% or more in water.

15. A recording liquid according to claim 13, wherein said cyclic compound is cyclodextrin or its derivative.

16. A recording liquid according to claim 13, wherein the content of said cyclic compound is within the range of 0.1 to 20% by weight of the total weight of the recording liquid.

17. A recording liquid according to claim 13, wherein said dye is a water-soluble dye.

18. A recording liquid according to claim 13, wherein said recording liquid has a viscosity at 25° C. of 5 cp or less.

19. A recording liquid according to claim 13, wherein said recording liquid has a viscosity at 25° C. of 3 cp or less.

20. A recording liquid according to claim 13, wherein said recording liquid has a surface tension at 25° C. within the range of 35 to 65 dyne/cm.

* * * * *

UNITED STATES PATENT AND TRADEMARK OFFICE
CERTIFICATE OF CORRECTION

PATENT NO. : 4,838,938
DATED : June 13, 1989
INVENTOR(S) : YASUKO TOMIDA, ET AL.

It is certified that error appears in the above-identified patent and that said Letters Patent is hereby corrected as shown below:

On the title page:

IN [57] ABSTRACT

Line 5, "moleuclar" should read --molecular--.

COLUMN 1

Line 17, "recording" should read --record--.
    Line 21, "used" should read --used for--.
    Line 25, "performance" should read --perform--.
    Line 35, "stored" should read --be stored--.

COLUMN 2

Line 54, "near" should read --new--.
    Line 66, "is" (second occurrence) should be deleted.

COLUMN 10

Line 34, "++++ blurring after 10 seconds" should read --++++ no blurring after 10 seconds--.

COLUMN 11

Line 10, "followability" should read --flowability--.

TABLE 2, "Frequency response" should read --Frequency response *7--.

UNITED STATES PATENT AND TRADEMARK OFFICE
CERTIFICATE OF CORRECTION

PATENT NO. : 4,838,938
DATED : June 13, 1989
INVENTOR(S) : YASUKO TOMIDA, ET AL.   Page 2 of 2

It is certified that error appears in the above-identified patent and that said Letters Patent is hereby corrected as shown below:

COLUMN 14

Line 2, "derivative." should read --derivatives.--.

Signed and Sealed this

Twenty-eighth Day of August, 1990

Attest:

HARRY F. MANBECK, JR.

*Attesting Officer*   *Commissioner of Patents and Trademarks*